United States Patent [19]

Ilmaier et al.

[11] 4,059,417
[45] Nov. 22, 1977

[54] METHOD FOR PRODUCING ALUMINA AND ALUMINA-ZIRCONIA ABRASIVE MATERIAL

[75] Inventors: Bernard Ilmaier, Treibach; Hans Zeiringer, Kappel, Krapfeld, both of Austria

[73] Assignee: Treibacher Chemische Werke Aktiengesellschaft, Treibach, Austria

[21] Appl. No.: 694,993

[22] Filed: June 10, 1976

Related U.S. Application Data

[62] Division of Ser. No. 579,555, May 21, 1975, abandoned.

[30] Foreign Application Priority Data

| | | | |
|---|---|---|---|
| May 29, 1974 | Austria | | 4420/74 |
| May 29, 1974 | Austria | | 4423/74 |
| June 25, 1974 | Austria | | 5276/74 |

[51] Int. Cl.$^2$ .................... C04B 31/16; B24D 3/04
[52] U.S. Cl. ................... 51/309 A; 51/307; 264/298; 264/332

[58] Field of Search ............... 51/309, 293, 307; 264/332, 298

[56] References Cited

U.S. PATENT DOCUMENTS

| 3,607,162 | 9/1971 | Bockstiegel | 51/309 |
|---|---|---|---|
| 3,662,058 | 5/1972 | Crespi | 264/332 |

FOREIGN PATENT DOCUMENTS

| 1,107,031 | 3/1968 | United Kingdom | 51/309 |
|---|---|---|---|

*Primary Examiner*—Donald J. Arnold
*Attorney, Agent, or Firm*—Kurt Kelman

[57] ABSTRACT

Abrasive granules are produced from alumina or an alumina-zirconia mixture by melting the oxide material and rapidly cooling the melt. To control the solidification velocity, the melt is cast into a molten chloride of Na, Ca, Ba, Mg or mixtures thereof to cool the oxide material melt, the chloride is separated from the cooled and solidified oxide material, and thereafter abrasive granules are produced from the solidified oxide material.

18 Claims, No Drawings

METHOD FOR PRODUCING ALUMINA AND ALUMINA-ZIRCONIA ABRASIVE MATERIAL

This is a division of application Ser. No. 579,555, filed May 21, 1975 now abandoned.

The present invention relates to a method of producing an abrasive material comprised essentially of corundum or corundum and zirconia, which is essentially free of tension and tension cracks, and is finely crystalline, has improved grain tenacity and stability.

It is known from U.S. Pat. No. 1,192,709 that rapid cooling of corundum increases the grain tenacity of abrasive materials produced therefrom. Furthermore, it is known from U.S. Pat. No. 1,240,490 that the addition of zirconia to corundum increases the tenacity or impact strength of such products.

The trend in the industry being towards even higher requirements for the efficiency of abrasive materials, these teachings have been applied to corundum-zirconia abrasives and, during the last decade, a 25% zirconia-corundum abrasive has been introduced for various polishing and abrading operations involving high pressure and impact requirements. Such abrasive materials may be produced, for instance, by the methods disclosed in U.S. Pat. No. 3,181,939. This discloses a fused abrasive material consisting essentially of a mixture of corundum and zirconia, and containing less than 0.1% soda. The zirconia is present in an amount of 10 to 60%, by weight, and the mixture consists of corundum-zirconia eutectic portion and a portion of crystals of corundum and/or zirconia having an average size up to 300 microns. This abrasive material has a high impact strength making it suitable for snagging stainless steel.

For precision and semi-precision abrading, a 40% zirconia-corundum material according to German published patent application No. 2,227,642 may be used.

However, the development reflected in this state of the art has not yet reached its optimum goal and the need for even more effective abrasive materials with higher tenacity remains.

The quality of the above-described abrasive materials is determined not only by their crystal structure but also by the magnitude of the phases participating therein. As shown by U.S. Pat. No. 3,181,939, for example, one parameter of the quality is constituted by the magnitude of the primarily separated corundum crystallites in the 25% zirconia-corundum material. To judge the quality of the eutectic zirconia-corundum, the diameter of the mostly rodshaped zirconia crystallites in the eutectic is used, as indicated in published German patent application No. 2,227,642.

A number of cooling procedures for the fused oxide material have been proposed to obtain an abrasive material of fine crystalline structure.

According to U.S. Pat. No. 3,181,939, the melt of the abrasive oxide material is cast in small molds of metal or graphite. The size of the crystallites in the material depends on the cooling speed of the melt in the crystallization range. The size of the mold and the corresponding amount of the cast melt influences the speed of cooling and, correspondingly, the size of the crystallites within certain limits. This method has the disadvantages that the melt cools too slowly at the surface and that the surface of the melt is in contact with air. This produces a porous surface layer which is a material of little or no use of the manufacture of abrasive granules.

According to German published application No. 3,205,436, abrasive material melts are cooled by casting them on metallic, such as ferrous, mold bodies. This method has several disadvantages. The output is small since only small amounts of melt can be cast into the shallow cooling molds. Furthermore, a feeding band is usually produced which is in contact with the air and cools only slowly to produce a material useless for the production of abrasive granules. In addition, some of the mold material is worn because it is fused by the melt and some mold metal contaminates the melt.

The fused oxide material cools rapidly on the metallic shaped bodies down to a temperature of about 1000° C. Since this rapid cooling to a temperature below the solidification point of the fused oxide material is unavoidable, this known method necessarily produces products which are under high tension and are crisscrossed by tension cracks. The same holds true for abrasive materials produced by casting into a mold, such as described in published German patent application No. 2,264,202.

Published German patent application No. 2,160,705 describes a method of cooling the fused oxide materials by casting it on silicon-containing iron pieces. While this is supposed to produce a crack-free abrasive, it does not produce a finely crystalline product because it does not permit very rapid solidification of the oxide material melt.

It is the primary object of this invention to provide a finely crystalline abrasive material which is substantially free to tension and tension cracks whereby the effectiveness of the material in respect of grain tenacity and stability is considerably enhanced.

According to the method of the present invention, abrasive granules are produced on the basis of an oxide material consisting of alumina and a mixture thereof with zirconia, by melting the oxide material and rapidly cooling the melt, the melt being cast into a molten salt to cool the oxide material melt, the salt being separated from the cooled and solidified oxide material, and the abrasive granules thereafter being produced from the solidified oxide material.

One of the major advantages of this method resides in the fact that the amount and/or the composition of the molten salt and the temperature thereof can be so chosen that the specific heat of the molten salt suffices to cool the entire case melt rapidly to a temperature of about 1350° C to 1550° C, i.e. a temperature range wherein crystal growth stops in zirconia-corundum eutectics. In this manner, a fine crystal structure is retained.

The indicated temperature range is between about 50° C and 350° C, preferably 100° C to 150° C or 250° C, below the solidification temperature of the fused oxide material. The rapid cooling to this temperature range proceeds within 10 seconds, preferably five, or even one, seconds.

The cooling effect to obtain solidification of the fused oxide material is increased by selecting the evaporation point of the molten salt so that it partially is evaporated when the oxide material melt is cast thereinto, i.e. it is locally superheated so that the salt vapors rapidly circulate the oxide material melt in the bath. This circulation may be further enhanced by agitation.

The further cooling of the rapidly cooled oxide material below the range of about 1350° C to 1550° C then proceeds more slowly to a temperature of about 800° C, preferably 500° C, at a maximum temperature of 40° C, preferably 20° C, per minute. This may be effected by cooling the material with iron spheres to obtain a material substantially free of tension and tension cracks. This material produces surprisingly high quality abrasive granules during the subsequent, generally conventional comminution treatment and greatly improved stability of the resultant abrasive granules in commercial operations.

The corundum-zirconia abrasives of the invention differ essentially from the procedure of published German patent application No. 2,160,705 since it has been shown that they can be produced only if the fused eutectic is rapidly cooled to below the melting temperature thereof. This is in contrast to application No. 2,160,705, according to which slow cooling immediately follows solidification. We have found that the quality of the abrasive material is surprisingly enhanced if rapid cooling proceeds to a temperature between at least 50° C and at most 250° C, or 350° C in case of very pure raw materials, below the lowest limit of the solidification range of the fused oxide material. The exact temperature within this rapid cooling range is selected in dependence on the purity of the oxide material.

While we do not wish to be bound by any specific theory, the surprising effect may be explained by the fact that rapid growth of the crystallites proceeds up to about a temperature of 50° C below the melting points, i.e. the lowest temperature within the solidification range. As the temperature decreases, the crystal growth is slowed down and ceases entirely at about 100° C below the melting point. Thus, a finely crystalline corundum-zirconia abrasive material is produced and the subsequent slow cooling of such a material results in an abrasive free of tension and cracks.

We have found that the method of the present invention is also very effective in producing high quality corundum abrasive materials which melt at a considerably higher temperature than the corundum-zirconia eutectics.

The method of this invention has the added advantage of producing a pre-attrition of the oxide material by means of the salt melt into which it is cast and which is separated from the solidified oxide material. This reduces the subsequent milling requirements and makes it possible to comminute the solidified oxide material to abrasive granules by means of conventional impact or roller mills, impact milling being preferred for the production of polygonal granules and roller milling being preferred for the production of elongated granules.

As indicated hereinabove, partial evaporation of the molten salt bath will rapidly move the fused oxide material and thus aid in its attrition. This attriting effect may be varied by changing the temperature and/or composition of the salt melt and/or agitating the melt during casting.

Useful salts for cooling the fused oxide material include those having a relatively low melting point and a high boiling point. It will be commercially useful to use water soluble salts to facilitate the complete separation of the salt from the abrasive material. Desirably, the molten salt will have a specific heat in the range of the molten state in excess of 0.1, preferably 0.2, cal/g°. Furthermore, the salt should be sufficiently inert to prevent chemical reactions with the abrasive oxide material. A preferred salt is molten calcium chloride, which has a melting point of 765° C and a boiling point of about 1600° C, its specific heat in the molten state between 0.2 and 0.3 cal/g°. It is highly water soluble. A mixture of calcium chloride with about 1% to 20%, by weight, of sodium chloride has similar characteristics.

By way of example, other useful salts include barium chloride, as well as mixtures of barium and calcium chloride, barium and sodium chloride, and calcium and magnesium chloride in wide ranges of concentration.

In addition to corundum and, if desired, zirconia, the abrasive materials of the invention preferably contain no more than about 5%, preferably no more than 2%, by weight, of a metal selected from the group consisting of chromium, iron, silicon, titanium, vanadium, calcium, magnesium and rare earth, or an oxide, carbide, carbontrile or nitride of the metal since such impurities reduce the quality of the abrasive materials, particularly in respect to the stability thereof.

In the abrasive materials based on corundum containing up to 5%, by weight, of the indicated impurities and produced according to the invention, the average size of the corundum crystallites is between 1 to 50 $\mu$m, primarily 4 to 10 $\mu$m.

In the abrasive materials based on a mixture of corundum and 23% to 27%, by weight, of zirconia, which are used primarily in surface working operations requiring high pressures and impact, the average size of the primarily separated corundum crystallites is between 1 to 50 $\mu$m, primarily 5 to 20 $\mu$m.

In an abrasive material comprised essentially of corundum and zirconia, wherein at least 90%, by weight, of the corundum and zirconia is in an eutectic mixture, i.e. which contains about 40% to 44%, by weight, of zirconia, based on the pure oxide mixture, the average diameter of the mostly rod-shaped zirconia crysallites is between 3,000 Å and 6,000 Å, a small portion of these crystallites being outside that range.

The following specific examples will further illustrate the practice of the invention, all percentages being by weight unless otherwise indicated. The first nine examples use the method of the present invention.

EXAMPLE 1

Five hundred kilogram of an oxide mixture consisting of 73.5% $Al_2O_3$, 24.8% $ZrO_2$, 0.4% $TiO_2$, 0.3% $SiO_2$ and the remainder consisting of other oxide impurities, was fused in an electric arc furnace. The oxide melt was cast into a carbon-clad receptacle containing 1200 kg of a calcium chloride bath at a temperature of 800° C. After the casting was completed, the temperature of the salt melt had risen within 5 seconds to about 1400° C. After 40 minutes, the bath reached a temperature of 1200° C and was removed from the receptacle to leave the solidified abrasive oxide material resting on grate in the receptacle, most of the salt melt adhering to the oxide material being permitted to drip off through the grate. The material continued to cool slowly, i.e. the temperature dropped from 1200° C to 500° C in a period of about 5 hours.

The salt melt removed from the receptacle contained so much heat energy that no further heating was necessary to keep the calcium chloride in the molten state for the subsequent casting operation or during the required addition of fresh calcium chloride.

After the solidified oxide material was coarsely disintegrated, any remaining calcium chloride was leached therefrom by means of a stream of water flushed through the disintegrated material. The resultant material was granulated in a conventional manner to provide desired grain fractions according to the norms of FEPA (Federation Europeenne des Fabricants de Produits Abrasifs). The outstanding properties of the thus obtained abrasive material were shown by subjecting the material to an accepted grain tenacity test proposed by Batelle Institute and used throughout the industry, which had to be slightly modified to produce data for the very tough zirconia-corundum abrasives at low rotary speeds after a shortened test period.

The coarsely granulated material obtained by the attrition was screened to obtain grain fractions 10 and 12 (according to FEPA norms) and 50 g of each fraction were introduced into an iron ball mill containing five steel balls having a diameter of 35 mm. The interior of the mills contained three bars arranged at angles of 120° in relation to each other. The ball mill was then turned until two thirds of the change passed a No. 14 screen. A counter was connected to the mill to count the turns, and the number of turns of the mill required to attrite the granulated material to an extent comminuting two thirds of the grain fractions 10 and 12 to pass through screen No. 14 was the measure of the tenacity of the grains.

Since the results depend somewhat on the shape of the grains and this shape influences the apparent density, Tables I and V also show the apparent density of the abrasives.

Electron microscopic measurement showed the average diameter of the mostly rod-shaped $ZrO_2$ crystallites in the eutectic to be between 1,000 and 13,000 A, primarily between 4,000 and 8,000 A. The corundum crystallites had an average size of 1 to 50 $\mu m$.

The quality of the products of Example 1 was compared with that of products obtained by commercially available methods, for which purpose the identical oxide mixture melt was cast on iron balls having a diameter of 30 mm, and into an iron mold having walls at a distance of 10 mm. The results are given hereinbelow in Table I.

It was found that optimum results are obtained when the exemplified initial temperature of the cooling salt bath and not a higher temperature is used because the poor heat conductivity of the corundum-zirconia eutectic otherwise prevents a rapid enough cooling to a temperature in the range of 1350° C to 1500° C, thus permitting excessive crystal growth.

EXAMPLE 2

The procedure of Example 1 was followed but the salt bath consisted of 1500 kg of barium chloride having a temperature of 1000° C. The results are again given in Table I.

EXAMPLE 3

The procedure of Example 1 was followed but attrition of the oxide material was enhanced by partial salt evaporation with the use of a salt bath consisting of 900 kg of calcium chloride and 100 kg of sodium chloride, the bath having a temperature of 800° C. The results are given in Table I.

Table I

|  | Apparent density g/ccm | Grain tenacity: No. of mill turns to ⅔ disintegration |
| --- | --- | --- |
| Abrasive materials obtained by casting on iron balls | 2.08 | 17,200 |
| Abrasive materials obtained by casting into iron mold | 2.07 | 16,800 |
| Abrasive materials obtained by Example 1 | 2.28 | 27,300 |
| Abrasive materials obtained by Example 2 | 2.25 | 26,200 |
| Abrasive materials obtained by Example 3 | 2.28 | 27,500 |

Table I clearly shows a substantial increase in the grain tenacity of the abrasive grains obtained by the method of the present invention as compared to the quality of conventionally produced abrasive materials.

EXAMPLE 4

500 kilogram of an oxide mixture consisting of 41.0% $ZrO_2$, 58.25% $Al_2O_3$, 0.04% $SiO_2$, 0.35% $TiO_2$, 0.18% CaO, 0.13% MgO, and the remainder other oxide impurities, was melted in an electric arc furnace, and the melt was cast into 100 kg of a $CaCl_2$ bath contained in a carbon-clad tub. The salt evaporated partially and the melt was comminuted and cooled rapidly to a temperature of 1400° C to 1500° C. After the temperature was slowly lowered, about 5° C per minute, to 1200° C, the salt bath was poured out of the tub and the granulated oxide material was placed on a graphite grate to permit adhering salt melt to drip off and further to cool the oxide material to about 500° C to 600° C. Any traces of the salt were removed from the coarsely disintegrated material by leaching with water.

The resultant abrasive material was milled to obtain grain fractions 20 and 25 (FEPA norms).

The grain tenacity index, which reflects the abrading efficiency of the material, was determined by the following method:

25 grams of grain fractions 20 and 25 were introduced into an adjustable steel roll mills containing a metallic cylindrical body. At a constant rotary speed, of the mill remaining constant, the comminuted material was classified on a No. 35 screen (FEPA, norm) after 10, 30, 70 and 90 minutes of milling. The indicated grain tenacity index is the proportion of the times required to disintegrate 50% of the grains of the conventional abrasive and of the product obtained by the examples of this invention. The grain tenacity determination according to the Battelle Institute method confirmed the results but is more time-consuming.

Quality comparison of the abrasive materials obtained according to the examples and those produced by casting the identical melt on iron balls of 10 diameter or into an iron mold with a 3 mm distance between the mold walls was effected by comminuting the prior art granulated materials into grain sizes 20 and 25. The results appear in Table II.

The micro structure of the abrasive material was obtained by examining the same in an interference electron microscope. This showed that the rod-shaped $ZrO_2$ crystallites in the eutectic mixture had an average diameter of 2,000 to 10,000 A, primarily 3,000 to 6,000 A. Only a very minor portion of the rods had diameters below 2,000 A or above 10,000 A.

EXAMPLE 5

The oxide melt of Example 4 was cast into 2.4 times its weight of a barium chloride bath having a temperature of 1000° C. The results are given in Table II.

EXAMPLE 6

The oxide melt of Example 4 was cast into a mixture of 80% calcium chloride and 20% sodium chloride at a temperature of 750° C. The results are given in Table II.

EXAMPLE 7

Theoretically, it could be assumed that best results would be obtained if the initial temperature of the salt bath were so selected that its temperature during the entire casting period would be in the range of about 100° C to 250° C below the solidification point of the oxide material melt. To test this theory, the following test was run:

Sixty kilograms of the oxide melt of Example 4, which had a temperature of 1900° C, was cast into 1000 kg of a $CaCl_2$ bath having an initial temperature of 1300° C. The equilibrium temperature between the salt bath and the oxide material solidified therein was 1400° C. The test result is shown in Table II.

The average diameter of the $ZrO_2$ crystallites in the eutectic in Examples 5 to 7 was between 4,000 and 8,000 A.

Table II

| | Grain Tenacity % of grain residue on Screen No. 35 after | | | | grain Tenacity Index |
|---|---|---|---|---|---|
| | 10' | 20' | 70' | 90' | |
| Abrasive materials obtained by casting on iron balls | 93 | 80.5 | 64.5 | 62.0 | 2.0 |
| Abrasive materials obtained by casting into iron mold | 92 | 78.5 | 69.5 | 59.00 | 1.98 |
| Abrasive materials obtained by Example 4 | 97.5 | 86 | 76.0 | 70.5 | 2.25 |
| Abrasive materials obtained by Example 5 | 96 | 83.5 | 74.5 | 69.5 | 2.20 |
| Abrasive materials obtained by Example 6 | 98.5 | 87.5 | 76.5 | 71.0 | 2.27 |
| Abrasive materials obtained by Example 7 | 95.5 | 82.5 | 74.0 | 69.0 | 2.19 |

Tables I and II show the outstanding quality enhancement obtained by the method of the present invention, particularly as set forth in Examples 1 to 6. Particularly favorable results are obtained when the initial temperature of the salt bath at the time of casting the oxide material melt thereinto is between about 800° C and 1000° C. If the temperature is higher, as in Example 7, crystal growth is apparently prolonged, which has a deleterious effect on the abrasive effectiveness of the material.

EXAMPLE 8

An abrasive oxide material consisting of 96.44% $Al_2O_3$, 2.35% $TiO_2$, 0.63% $SiO_2$, 0.17% FeO, 0.28% CaO, and the remainder other impurities, was fused in an electric arc furnace and the melt was cooled by casting it into 2.4 times its weight of a $CaCl_2$ bath having an initial temperature of 800° C. The further comminution was obtained in the manner of the preceding examples. The grain tenacity was tested according to the ball mill method described in connection with Example 1. The size of the major portion of the corundum crystallites in the resultant abrasive was between 1 and 50 μm.

The resultant abrasive was compared with the commercially available brown corundum in a test whose results are shown in Table III.

Table III

| | Apparent density g/ccm | Grain tenacity: number of mill turns to ⅜ disintegration |
|---|---|---|
| Conventional corundum | 1.85 | 3,200 |
| Abrasive of Example 8 | 2.01 | 5,300 |

EXAMPLE 9

To save on salt, the oxide material melt of Example 4, having a temperature of 1900° C, was cast into a receptacle containing 200 kg of a $CaCl_2$ bath having a temperature of 800° C, together with 400 kg of solid $CaCl_2$ whose heat content and melting heat was thus used to cool the oxide material melt. The resultant abrasive material is identical with that of Example 4 but the procedure saved 400 kg of the salt.

The above examples show the increased grain tenacity of impact strength obtainable in corundum or corundum-zirconia abrasive materials by the method of the present invention.

What we claim is:

1. A method for producing abrasive granules on the basis of an oxide material selected from the group consisting of alumina and a mixture thereof with zirconia, wherein the oxide material is melted and the melt is rapidly cooled, comprising the steps of casting the melt into a molten salt selected from the group consisting of NaCl, $CaCl_2$, $BaCl_2$, $MgCl_2$ and mixtures thereof to cool the oxide material melt, separating the salt from the cooled and solidified oxide material, and thereafter producing abrasive granules from the solidified oxide material.

2. The method of claim 1, wherein the melt of the oxide material is cast into the molten salt containing a solid $CaCl_2$.

3. The method of claim 1, wherein the rapid cooling of the melt of the oxide material is permitted to proceed to a temperature between about 50° C and 350° C below the solidification temperature of the melt.

4. The method of claim 3, wherein the cooling of the melt of the oxide material is permitted to proceed to a temperature between about 100° C and 250° C below the solidification temperature of the melt.

5. The method of claim 3, wherein the oxide material is essentially a mixture of alumina and zirconia, the rapid cooling temperature is obtained by selection of the amount and/or composition of the molten salt, and the temperature thereof, the rapid cooling proceeds to said temperature within 10 seconds, and the rapidly cooled oxide material is then cooled further to a temperature of about 800° C at a maximum temperature of 40° C per minute.

6. The method of claim 5, wherein the rapid cooling is permitted to proceed to a temperature between about 100° C and 250° C below the solidification temperature of the melt to a temperature between about 1350° C to 1550° C within 5 seconds, and the rapidly cooled oxide material is then cooled further to a temperature of about 500° C at a maximum temperature of 20° C per minute.

7. The method of claim 6, wherein the rapid cooling proceeds within one second.

8. The method of claim 1, wherein the molten salt is selected to have an evaporation point causing it partially to evaporate when the oxide material melt is cast thereinto.

9. The method of claim 1, wherein the circulation of the oxide material melt is enhanced by agitation thereof.

10. The method of claim 1, wherein the circulation of the molten salt is enhanced by increasing the temperature thereof.

11. The method of claim 1, wherein the molten salt is water soluble.

12. The method of claim 1, wherein the molten salt has a low melting point and a high boiling point.

13. The method of claim 1, wherein the molten salt has a specific heat in the range of the molten state in excess of 0.2 cal/g°.

14. The method of claim 1, wherein the molten salt is calcium chloride.

15. The method of claim 1, wherein the molten salt is a mixture of calcium chloride with up to 20% by weight, of sodium chloride.

16. The method of claim 1, wherein the oxide material is substantially pure alumina.

17. The method of claim 1, wherein the oxide material is a substantially pure mixture of alumina and zirconia.

18. The method of claim 1, wherein the oxide material includes up to 5% by weight impurities selected from the group consisting of oxides, nitrides, carbonitrides or carbides of chromium, iron, silicon, titanium, vanadium, calcium, magnesium and rare earths.

* * * * *